(12) United States Patent
Teverovsky et al.

(10) Patent No.: US 10,346,085 B1
(45) Date of Patent: Jul. 9, 2019

(54) DISTRIBUTED RESTORE ANYWHERE FOR DIRECTORY SERVICES

(71) Applicant: Semperis, New York, NY (US)

(72) Inventors: Guy Teverovsky, Kefar Sava (IL); Matan Liberman, Ramat Gan (IL); Michael Bresman, Hoboken, NJ (US)

(73) Assignee: Semperis, New York, NY (US)

( * ) Notice: Subject to any disclaimer, the term of this patent is extended or adjusted under 35 U.S.C. 154(b) by 0 days.

(21) Appl. No.: 16/269,938

(22) Filed: Feb. 7, 2019

(51) Int. Cl.
*G06F 12/00* (2006.01)
*G06F 13/00* (2006.01)
*G06F 3/06* (2006.01)
*H04L 29/12* (2006.01)

(52) U.S. Cl.
CPC .............. *G06F 3/065* (2013.01); *G06F 3/067* (2013.01); *G06F 3/0619* (2013.01); *H04L 61/1511* (2013.01); *H04L 61/1523* (2013.01)

(58) Field of Classification Search
CPC .. G06F 3/0619; G06F 3/067; G06F 311/1451; G06F 11/1458; G06F 13/122; G06F 2221/0782
See application file for complete search history.

(56) References Cited

U.S. PATENT DOCUMENTS

| | | | | |
|---|---|---|---|---|
| 6,185,574 | B1 * | 2/2001 | Howard | G06F 16/168 |
| 9,396,285 | B1 * | 7/2016 | Fitterer | G06F 16/211 |
| 2013/0110891 | A1 * | 5/2013 | Ogasawara | G06F 3/0604 |
| | | | | 707/827 |
| 2017/0366606 | A1 * | 12/2017 | Ben-Shaul | H04L 67/1097 |
| 2019/0012104 | A1 * | 1/2019 | Schreter | G06F 16/951 |

OTHER PUBLICATIONS

Kennedy et al., "Overview of Processing a Backup Under VSS", Windows applications, Microsoft Docs, May 30, 2018, https://docs.microsoft.com/en-us/windows/desktop/VSS/overview-of-processing-a-backup-under-vss, 3 pages.
Flores et al., "Active Directory Forest Recovery Guide" Microsoft Docs, Aug. 8, 2018, https://docs.microsoft.com/en-us/windows-server/identity/ad-ds/manage/ad-forest-recovery-guide , 2 pages.
Flores et al., "Determine How to Recover the Forest", Microsoft Docs, Aug. 8, 2018, https://docs.microsoft.com/en-us/windows-server/identity/ad-ds/manage/ad-forest-recovery-determine-how-to-recover, 10 pages.
"Recovery Manager for Active Directory Forest Edition", https://www.quest.com/products/recovery-manager-for-active-directory-forest-edition/, 7 pages.

* cited by examiner

*Primary Examiner* — Sean D Rossiter
(74) *Attorney, Agent, or Firm* — Lowenstein Sandler LLP (57) ABSTRACT

Technology for backing up and restoring directory services that have a domain hierarchy (e.g., a domain forest). The technology may analyze operating system level backup data of multiple domain controllers and decouple data of the directory service from the backup data. The decoupled data may be absent executable data and may represent the backed up state of the directory service. The decoupled data may be enriched to include additional information about the computing environment and stored in a storage object (e.g., a forest recovery object). The technology may use the storage object to restore the directory service to the same set of computing devices or to a different set of computing device. This may involve configuring one or more of the computing devices to support directory services and coordinating an update to the configured computing devices to restore the backed up state of the directory service.

20 Claims, 4 Drawing Sheets

DISTRIBUTED RESTORE ANYWHERE FOR DIRECTORY SERVICES

COPYRIGHT NOTICE

Portions of the disclosure of this patent document may contain material subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to directory services in a computing environment and, more specifically, to backing up and restoring directory services that involve hierarchical domains (e.g., domain forests).

BACKGROUND

Modern computing environments often include a directory service to manage the users and devices that participate in the computing environment. The directory service may function as a centralized mechanism to authenticate entities (e.g., users or devices) and may authorize or restrict the entities from performing certain computing tasks. The directory service may include one or more domains to organize user accounts, computing resources, or a combination thereof. Each user or device may authenticate with the directory service and may then access shared resources over a network without authenticating to each individual shared resource. For example, the directory service may enable a user to log into a computer that the user has not previously accessed by providing credentials that are recognized by the directory service. The user may then use the computing device to access networked resources, such as shared data storage or printers, without providing the credentials to the networked resource.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Directory services are often distributed across multiple computing devices that work together as a group to provide a directory service to client devices. The computing devices may be referred to as domain controllers and may each provide the directory service to a portion of the client devices in a computing environment. The portion of client devices may be specific to a logical organization (e.g., department), a physical organization (e.g., geographic site), other portion, or a combination thereof. The directory services executing on each computing device may be tightly integrated with the underlying operating system of the computing device and may include synchronization features. The synchronization features may enable the group of computing devices to synchronize modifications of the directory service between the different computing devices. The synchronization features and tight integration may create dependencies between the directory service and the computing devices. These dependencies often result in the operating system and the directory services being backed up and restored together. For example, Microsoft® provides Active Directory Domain Service® (ADDS) and requires that the operating system state and the directory service state be backed up and restored together.

Backing up and restoring the directory service state and the operating system state together makes the process more complex and error prone. This may delay or prohibit the restore process in the presence of an adverse event. An adverse event may be any event that adversely affects some or all of the directory service. The adverse event may be malicious, accidental, or unexpected and may include hardware events (e.g., hardware failure), software events (e.g., software defect), or a combination thereof. The events may affect the performance, reliability, or ability of one or more of the computing devices to provide authentication, authorization, or access services to one or more of the client devices in the computing environment.

Aspects of the present disclosure may address the above noted and other deficiencies by introducing technology to enhance the backup and restoration of a directory service. In an illustrative implementation, the technology may enable a processing device of a management server or one of the domain controllers to initiate backup operations on the computing devices that provide the directory service. The technology may enable the processing device to analyze backup data for one of the computing devices before, during, or after execution of one of the backup operations. The processing device may decouple data for the directory service from the backup data and the decoupled data may represent a first state of the directory service (e.g., a current state, backed up state). The processing device may then store the decoupled data for the directory service in a storage object. The storage object may be enriched to include additional information about the computing environment or about one or more of the other computing devices. The technology may then use the storage object to orchestrate the restoration of the directory service on the same set of computing devices or a different set of computing device. This may involve selecting and configuring one or more of the computing devices to provide (e.g., activate, configure, or install) directory services. The directory services on the configured computing devices may start out at a second state (e.g., default state). The technology may then update the second set of computing devices in view of the storage object to replace the second state with the first state to restore the directory service to the computing environment.

Systems and methods described herein include technology that enhances the backup and restoration of directory services. In particular, aspects of the present disclosure may enable the backup of the directory service to be decoupled from the operating system backups of the domain controllers. Traditional backup mechanisms require the directory service and operating system of a domain controller to be backed up and restored together. By decoupling the data of the directory service from the backup data of a domain controller, the technology may enable the directory service to be restored to a different computing device. This may be the same or similar to a "restore anywhere" feature. Aspects of the present disclosure may also or alternatively enhance security of the backup and restore mechanism by creating a backup of a directory service that is absent executable code. A traditional backup of a domain controller includes executable data that may include problematic executable code (e.g., malicious, corrupt, or defective program code). Restoring a computing device using the traditional backup mechanism may result in the same problematic executable code being persisted across the backup and restoration process. By decoupling the directory service data from the backup data, the technology herein may reduce or avoid the problematic executable code from being restored onto a replacement device. The aspects discussed above may also or alternatively enhance the processing of the one or more computing devices of the computing environment. For example, it may reduce the amount of data being processed, stored, or transmitted to backup or restore the directory services.

In the following detailed description, references are made to the accompanying drawings, which form a part of the description and in which are shown, by way of illustration, one or more specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Examples of systems, computer-readable storage media and methods according to the disclosed implementations are described in this section. The examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

Various aspects of the above referenced methods and systems are described in details herein below by way of examples, rather than by way of limitation. The examples discussed below reference Microsoft® Active Directory® but other versions of directory services may be used in addition or as an alternative.

Figure 1:
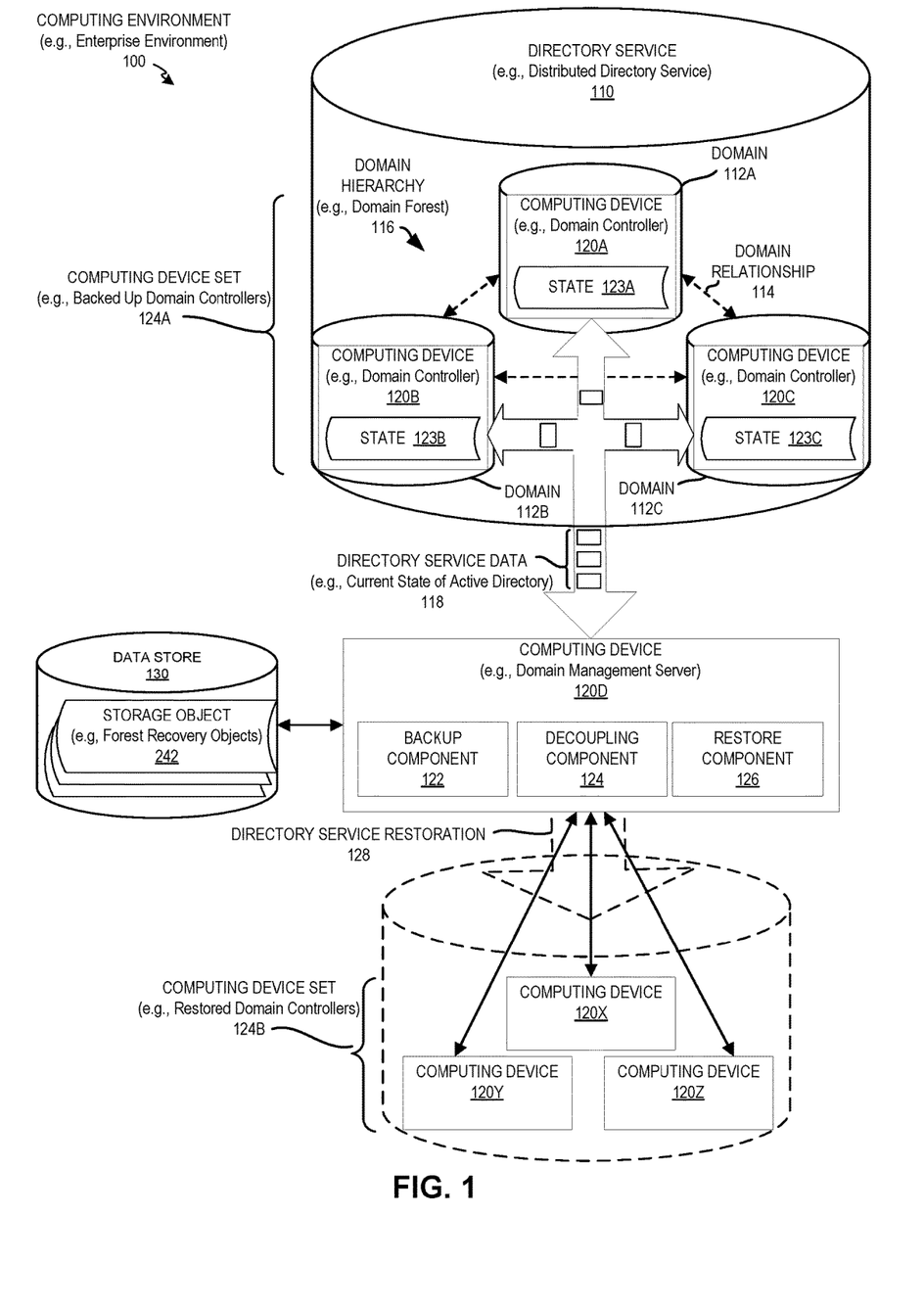
FIG. 1 shows a block diagram of an example computing environment in which a directory service may be backed up and restored to the same or different computing devices, according to some implementations.

FIG. 1 shows a block diagram of an example computing environment 100 with enhanced directory service backup and recovery features, in accordance with some implementations. It should be noted that other arrangements for computing environment 100 are possible, and that the implementation of a computer system utilizing embodiments of the disclosure are not necessarily limited to the specific environment depicted. In some implementations, computing environment 100 may not have all of the components or systems illustrated, or may have other components or systems instead of, or in addition to, those listed above. In the example shown, computing environment 100 may include a directory service 999, computing devices 120A-Z, and a data store 130.

Directory service 999 may be a shared information infrastructure for locating, managing, administering, and organizing computing objects of computing environment 100. The computing objects may represent computing resources such as users (e.g., user accounts), devices (e.g., desktops, printers), groups, data objects (e.g., files, records), other objects, or a combination thereof. Each computing object may be associated with identification data (e.g., object name and type), access control data (e.g., permissions), membership data (e.g., group membership), other data, or a combination thereof. In one example, directory service 999 may function as a centralized authentication mechanism that enables one or more client devices (not shown) to access or use computing objects within computing environment 100. Each user or device may authenticate with directory service 999 to access shared resources over a network without individually authenticating to each shared resource.

Directory service 999 may support proprietary protocols, standardized protocols, or a combination thereof. In one example, directory service 999 may be the same or similar to Microsoft® Active Directory® and may support client devices that run Microsoft Windows®, Linux®, Unix, other operating system, or a combination thereof. In another example, directory service 999 may be any directory service that supports a directory access protocol (DAP) and may not be a Microsoft product. In either example, the directory service may implement or support a Lightweight Directory Access Protocol (LDAP), other protocol, or a combination thereof. LDAP may be an industry standard application protocol for accessing and maintaining distributed directory information services in a vendor specific or vendor neutral manner. Directory service 999 may store or provide the distributed directory information services using one or more domains 112A-C.

Domains 112A-C may be organizational data structures that function as logical units to separate, integrate, or organize the computing objects. In one example, the computer objects for a single domain are stored in a single database that may or may not be replicated to other devices. A domain may be identified by its name space which may be the same or different from a Domain Name System (DNS) name space. Each of the domains 112A-C may be the same or similar to an LDAP domain, windows domain (e.g., Active Directory (AD) domain), other domain or organization unit, or a combination thereof. The domains may be linked to one another via a domain relationship 114 that may include a unidirectional trust, a bidirectional trust, other relationship, or a combination thereof. The relationships between the domains may result in a domain hierarchy 116.

Domain hierarchy 116 may be a logical unit for organizing a set of one or more domains. Domain hierarchy 116 may include an arrangement of domains that includes one or more levels. A first level (e.g., top level) of the domain hierarchy may include a domain that functions as a root domain. The root domain may include one or more domain relationships with one or more domains at a second level (e.g., lower level) of the domain hierarchy. The second level may be referred to as an intermediate level and may include domain relationships with domains at a third level of the domain hierarchy. Any number of levels (e.g., layers) may exist within domain hierarchy 116. In one example, the domain hierarchy may be a data structure representing a domain forest and the top level of the structure may be referred to as a root domain and the domain forest may include a set of domain trees at the second level. The domain forest may represent a security boundary within which users, devices, groups, or other objects are accessible. The domain trees may share a common global catalog, directory schema, logical structure, directory configuration, or a combination thereof.

Computing devices 120A-Z may be any computing devices capable of providing or managing features of directory service 999. One or more of the computing devices 120A-Z may be configured to function as a domain controller (DC) and may support one or more LDAP domains, Active Directory (AD) domains, other domains, or a combination thereof. Computing devices 120A-Z may be geographically collocated at a single site (e.g., office building, data center), geographically distributed across one or more sites, or a combination thereof. The computing devices 120A-Z may be configured to include a portion of the directory service (e.g., a single domain) or all of the directory service 999 (e.g., all domains). Each of computing device 120A-Z may service some, all, or none of the users or client devices associated with the domain. For example, a computing device at a site may service the users and devices at the particular site and one of the computing devices may function as a redundant domain controller or a backup domain controller and may not service any users or clients. Computing devices 120A-Z may be separated into multiple sets of computing devices (e.g., computing device set 124A and 124B).

Computing device sets 124A and 124B represent sets of computing devices that can provide directory service 999 to client devices in computing environment 100. Each of the sets may provide the directory service 999 in the past, present, future, or a combination thereof. As show in FIG. 1, computing device set 124A may include computing devices 120A-C that provide directory service 999 at a time of a backup and computing device set 124B may include computing devices 120X-Z that will provide directory service 999 in the future (e.g., after a restore operation). In one example, the computing devices in computing device set 124A and the computing devices in computing device set 124B may be the same computing devices but may have been reformatted, reinstalled, reimaged, other modification, or a combination thereof. In another example, one or more of the computing devices in computing device set 124A may be different from computing devices in computing device set 124B (e.g., one or more devices were replaced).

A computing device may be considered the same or different based on the computing device's software features, hardware features, or a combination thereof. For example, computing devices in the sets may be the same when their underlying hardware devices are the same or at least substantially similar. The underlying hardware devices may be the same if all of the hardware identifiers match and the computing devices may be substantially similar when most of the hardware devices use the same hardware identifiers (e.g., serial number) but at least one hardware device uses a different hardware identifier. This may occur when at least one of the hardware devices (e.g., hard drive, memory, processing unit (e.g., Central Processing Unit (CPU) or Graphical Processing Unit (GPU)) is defective and has been replaced before, during, or after a restore process.

Computing device 120D may be the same or similar to the computing devices discussed above and may include one or more components to manage the backup and restoration of directory service 999. In one example, the components of computing device 120D may be incorporated into one or more agents that execute on one of computing devices that provide directory service 999 either currently or in the future. In another example, the components of computing device 120D may exist on a device that is separate from a computing device that provides the directory service. In other examples, the features of components 122, 124, and 126 may be executed on a combination of computing devices that may include a computing device that provides directory service and a computing device that does not provide the directory service (e.g., backup and restoration server).

As shown in FIG. 1, computing device 120D may include a backup component 122, a decoupling component 124, and a restore component 126. Backup component 122 may enable computing device 120 to initiate backups on the computing devices providing directory service 999. The decoupling component 124 may decouple data of the directory service from data received via the backups. The restore component 126 may enable the directory service to be restored to one or more computing devices. Restore component 126 may access data of one or more storage objects 132 to coordinate and execute a directory service restoration 999 (e.g., restoration process) across multiple computing devices. Components 124, 126, and 128 are discussed in more detail below in regards to FIG. 2.

One or more of the computing devices may be connected by a network (not shown). The network may include any network or combination of networks of systems or devices that communicate with one another. For example, the network can be or include any one or any combination of a LAN (local area network), WAN (wide area network), telephone network, wireless network, cellular network, point-to-point network, star network, token ring network, hub network, or other appropriate configuration. The network can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

Figure 2:
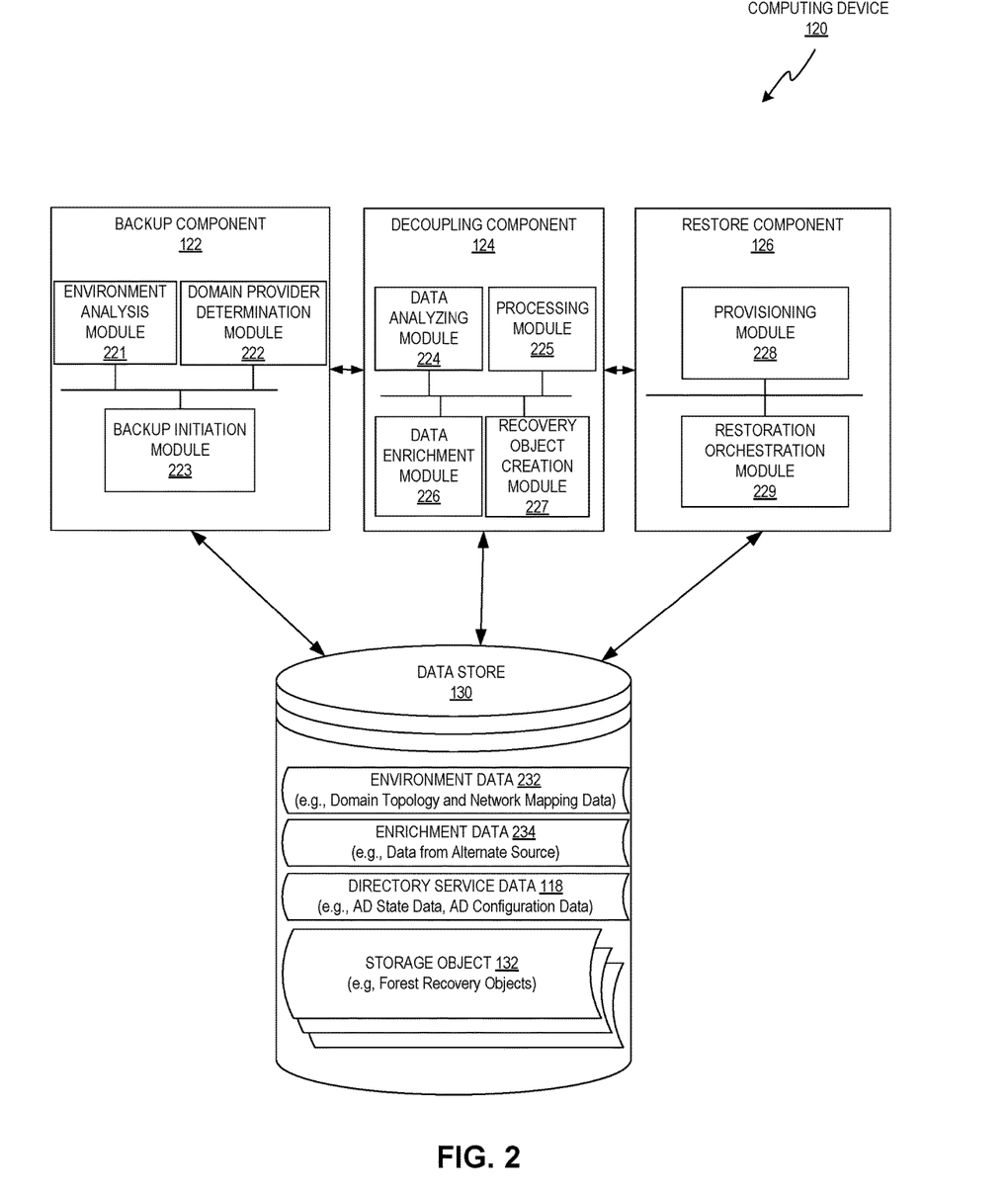
FIG. 2 shows a block diagram of example implementations of components of FIG. 1 and example interconnections between the components according to some implementations.

FIG. 2 depicts a block diagram illustrating an exemplary computing device 120 that provides directory service backup and restoration features, in accordance with aspects of the disclosure. Computing device 120 may include multiple components and modules. Computing device 120 may be the same or similar to computing device 120D of FIG. 1 or may represent one or more computing devices in set 124A, set 124B, other set, or a combination thereof. More or less components or modules may be included without loss of generality. For example, two or more of the components may be combined into a single component, or features of a component may be divided into two or more components. In one implementation, one or more of features of a component may be included as part of executable agents running on different computing devices (e.g., different domain controllers). In the example of FIG. 2, computing device 120 may include a backup component 122, a decoupling component 124, and a restore component 126.

The backup component 122 may enable computing device 120 to back up a directory service of a computing environment. In one example, backup component 122 may include an environment analysis module 221, a domain provider determination module 222, and a backup initiation module 223.

Environment analysis module 221 may include executable features for analyzing and acquiring data representing aspects of the computing environment. The aspects of the computing environment may include data (e.g., informational data or executable data) for one or more software features, hardware features, or a combination thereof. Environment analysis module 221 may acquire data of the computing environment from the local computing device, a remote computing device, other device, or a combination thereof. The data may be gathered from the computing environment by executing one or more operations. The operations may include launching a program, running a command, executing a function call, initiating an instruction, other operation, or a combination thereof. The operations may gather information using one or more application programming interface (API) calls, command line interface (CLI) commands, scripts, utilities, tools, other operations, or a combination thereof. The data may represent aspects of the computing environment and may originate from a persistent storage location or a non-persistent storage location. The persistent location may include one or more files (e.g., configuration file), databases (e.g., windows registry, directory service database), other location, or a combination thereof. The non-persistent location may be from data in memory or a processor register (e.g., session data, network data) and the data may or may not be stored in a persistent location (e.g., ephemeral data). Environment analysis module 221 may store the data of the computing environment in data store 130 as environment data 232.

Environment data 232 may represent aspects of the computing environment that includes the directory service. Environment data 232 may be the same or similar to the data acquired by the environment analysis module 221 or may be a redacted, enriched, or modified version of the acquired data. Environment analysis module 221 may be capable of acquiring and storing environment data 232 that includes network configuration data, domain topology data, device data, other data, or a combination thereof.

The network configuration data may include network server configurations or network client configurations and may be related to the Domain Name System (DNS) configurations for the computing environment and for one or more of the computing devices. Network configuration data may include the network address ranges available for use (e.g., 9.7.7.*), assigned network addresses (e.g., IP address, MAC address), DNS server, DNS suffix (e.g., products.company.com), whether network address is static or non-static (e.g., DHCP status), host names, gateway routers, subnet mask, other data, or a combination thereof. The network configuration data may also include network mapping data (e.g., DNS mapping data) that maps computing device names to network locations. In one example, the network mapping data may map host names to network addresses of some or all of the computing devices of the environment (e.g., all computing devices providing the directory service and network infrastructure).

The domain topology data may indicate the one or more domains present in the computing environment and their domain relationships. The domains for the directory service may be the same or different from the DNS domains. The domain topology data may include data about the domain hierarchy (e.g., domain forest) and one or more of the underlying levels (e.g., domain trees). The domain topology data may include domain identifier data (e.g., domain name or ID), device data (e.g., domain controller names for each domain), membership data (e.g., list of client devices or domain controllers), other data, or a combination thereof. In one example, the domain topology data may indicate that the directory service includes a hierarchy of domains and the hierarchy of domains may be one or more domain forests.

The device data may be another form of environment data 232 and may describe the computing platform of one or more computing devices. The computing platform may include details about the hardware platform, the software platform, or a combination thereof. The hardware platform may correspond to processor details (e.g., 64 bit x86), adapter details (e.g., networking interface, storage controller, graphics card), other hardware feature, or a combination thereof. The software platform may correspond to the operating system type (e.g., Windows, Mac, Linux, Unix, Windows Mobile, iOS, Android), operating system version (e.g., version number or service pack), file systems (e.g., disk layout, partitions, mapped drives), connections (e.g., sockets or sessions), device drivers, installed programs, running programs, network settings, other software features, or a combination thereof.

Domain provider determination module 222 may access data of the environment analysis module 221 and identify the computing devices in the computing environment that provide the directory service. There may be many computing devices that function together to provide the directory service. As discussed above, the directory service may include multiple domains (e.g., a hierarchy of domains) and each domain may be associated with one or more computing devices that provide services for the respective domain. Domain provider determination module 222 may optimize the backup process by selecting one or more computing devices (e.g., domain controllers) for each of the domains and adding identification information (e.g., host name, IP address) of the computing devices to a set (e.g., computing device set 124A of FIG. 1). The resulting set may be used to reduce the quantity of computing devices being backed up and therefore reduce the amount of data being analyzed, decoupled, and stored in order to back up the directory service. In one example, domain provider determination module 222 may identify the directory service for the computing environment using environment data 232 (e.g., domain topology). The directory service may include a hierarchy of domains and the domain provider determination module 222 may determine a single domain controller in the computing environment for each of the domains in the hierarchy.

Backup initiation module 223 may enable computing device 120 to initiate a backup of one or more of the computing devices providing the domain service. The backup may be initiated by generating a request and transmitting the request to an operating system or program of the computing device. In response to receiving the request, the computing device providing the directory service may begin performing one or more backup operations. The backup operations may involve one or more copy operations that are capable of copying data while the data is being used (e.g., executed or accessed) by the computing device being backed up. In one example, backup initiation module 223 may execute on a centralized management device (e.g., directory service backup server) and may initiate multiple requests and transmit the requests to multiple domain controllers in the set of domain controllers. In another example, backup initiation module 223 may execute as agents on multiple domain controllers and each agent may initiate a backup operation on a respective domain controller. In yet another example, there may be a combination of a centralized management device and one or more agents that interact to initiate one or more backups. Any of these examples may result in the generation, transmission, receipt, and/or storage of data that will be processed by decoupling component 124.

Decoupling component 124 may enable computing device 120 to decouple the data of the directory service from backup data. Decoupling component 124 may perform steps to decouple the directory service data from the backup data before, during, or after the backup process is initiated. As discussed above, decoupling component 124 may execute on the computing device that provides the directory service device, on a separate computing device (e.g., management server), or a combination thereof. When decoupling component 124 executes on the domain controller, there may be a reduction in the amount of data transmitted over a network because the data of the directory service may be transmitted and the remaining portion of the backup data may not be transmitted (e.g., discard OS specific backup data). In one example, decoupling component 124 may include a data analyzing module 224, a processing module 225, a data enrichment module 226, and a recovery object creation module 227.

Data analyzing module 224 may access backup data of one or more of the computing devices providing the directory service. In one example, the backup data may be accessed directly from the computing device, which may include accessing data via a non-persistent data storage device (e.g., shared memory), a persistent data storage device (e.g., shared file), other manner, or a combination thereof. In another example, the backup data may also or alternatively be accessed or received from a device different from the computing device providing the directory service. The other device may be a storage device, such as a network attached storage device (NAS), storage area network (SAN) device, other storage device, or a combination thereof. The storage device may provide snapshot functionality that can take a snapshot of the secondary storage of the computing device while the computing device is executing or with minimal down time. In either example, the backup data may be accessed as a data stream, a file object (e.g., image file), database object (e.g., record), other manner, or a combination thereof and may be processed by processing module 225.

Processing module 225 may enable computing device 120 to process the backup data to decouple directory service data 118 from the backup data. Processing the backup data may perform the decoupling using one or more operations that involve extracting, parsing, filtering, aggregating, indexing, searching, finding, trimming, truncating, padding, other operation, or a combination thereof. The decoupling may involve analyzing the backup data to identify or locate (e.g., parse, search, find) particular portions of the backup data that include directory service data 118. In one example, processing module 225 may access the backup data and locate particular database objects (e.g., registry keys) and may extract data (e.g., registry values) from the database objects. In another example, processing module 225 may access the backup data and locate particular file objects (e.g., configuration files) and may extract data (e.g., settings) from the file objects. In either example, the resulting data may be stored or transmitted as directory service data 118.

Directory service data 118 may include any data associated with the directory service and may include configuration data, domain data, other data, or a combination thereof. The configuration data may be separate from the domain object data and may include information data or executable data to configure a computing device to provide the directory service. The domain object data may be the same or similar to account data and may include information about the accounts and/or computing objects that represent computing resources. The computing object data may include user data (e.g., user accounts), device data (e.g., device accounts), group data, relationship data, data storage objects (e.g., files, records), other object data, or a combination thereof. The domain object data may include or be associated with identification data (e.g., object name and type), access control data (e.g., permissions), membership data (e.g., group membership), other data, or a combination thereof.

In one example, directory service data 118 may be derived from data stored in a domain data store (e.g., account store) on the computing device providing the directory service. The domain data store may include database objects, file-system objects, other objects, or a combination thereof. In one example, the domain data store may be a database and may be referred to as an Active Directory database (AD database). Decoupling directory service data 118 from the backup data may identify the portion of the backup data that represents a state of the directory service. The term "state" may correspond to a state of the directory service, a state of the hierarchy of domains (e.g., domain forest state), a state of the multiple domains (e.g., domain tree state), a state of an individual domain (e.g., domain state), or a combination thereof. The state of the directory service may be a single state or it may be a composite state, an aggregate state, or other state that is based on one or more underlying states, which may be referred to as constituent states. For example, the state of the directory service may be a composite state that includes the constituent states of each of the domains in the domain hierarchy.

The state of the directory service may be determined by analyzing the directory service data 118 of one or more computing devices. The state of the directory service may correspond to multiple states 123A-C of FIG. 1 on the multiple computing devices. States 123A-C may correspond to multiple domain data stores that indicate the condition of the domain object data within the respective domain data store. The state of the directory service may dictate how the directory service responds to authentication, authorization, and access requests of client devices of the computing environment. A directory service may have an initial state when it is added to a computing device. The initial state may be a default state and may transition to a new state when at least one domain object (e.g., user account) is updated (e.g., created, deleted, or modified).

Data enrichment module 226 may enable computing device 120 to gather enrichment data 234 that may be used to supplement directory service data 118. Enrichment data 234 may be retrieved from a source other than the backup data. In one example, enrichment data 234 may not be present within the backup data and may be derived from an alternate source. Enrichment data 234 may not be present in the backup data because it is absent from the backup data or because it is present in a form that cannot be interpreted, derived, or transformed into enrichment data 234. In another example, the enrichment data 234 may be derived from the backup date but it may be more efficient to gather the data from the alternate source. In either example, the alternate source may be any data source other than the backup data and may be from the same computing device the backup data is received from or from an alternate computing device. The alternate computing device may be another computing device that provides the directory service or a computing device that does not provide the directory service (e.g., provisioning manager, DNS server, DHCP server, other server). In addition or alternatively, the alternate source for deriving the enrichment data 234 may be the environment data 232 that was previously gathered or by using a technique discussed above (tool, utility, API, CLE) to gather or derive enrichment data 234.

Recovery object creation module 227 may enable computing device 120 to create one or more storage objects 132 that can be used to recover the directory service. Each of the storage objects 132 may be a data storage structure that can store and organize data to assist a computing device to recover the directory service to a state that is the same or similar to what existed when the backup occurred. Storage object 132 may include one or more file system objects (e.g., files, directories, metadata), database objects (e.g., tables, records, tuples, key-value pairs, or entire databases), other data objects, or a combination thereof. Storage object 132 may be stored on a persistent data storage device and include some or all of the data decoupled from the backup data (e.g., directory service data 118) and may also include some or all of the enrichment data 234, environment data 232, other data, or a combination thereof. In one example, one or more (e.g., all) of the storage objects 132 may be absent (without, missing, free of) executable data. In another example, one or more of the storage objects 132 may include executable data in the form of program code to assist with the configuration or state update.

The state of the directory service may be stored in a single storage object or in multiple different storage objects as shown in FIG. 2. Each of the multiple storage objects 132 may be separate and independent from one another or may be linked with one or more of the other storage objects. In one example, a storage object may include a copy of one or more of the domain data stores (e.g., AD databases) and one or more files (e.g., XML files). The files may include domain topology data, network mapping data, other data, or a combination thereof. The data in the storage object may be derived from or include data of directory service data 118, enrichment data 234, environment data 232, or a combination thereof and may be accessed by restore component 126.

Restore component 126 may enable computing device 120 to restore the directory service to one or more computing devices. Restore component 126 may access data of one or more storage objects 132 to determine which computing devices to restore the directory service to and how organized the restore process across multiple computing devices. In one example, the restore component 126 may include a provisioning module 228 and a restoration orchestration module 229.

Provisioning module 228 may identify a set of computing devices that can be used to provide directory services to the computing environment. As discussed above, the set of computing devices may include one or more of the computing devices that previously provided the directory service or may include different computing devices that did not previously provide the directory service. The set of computing devices that previously provided the directory service may be referred to as the first set (e.g., computing device set 124A of FIG. 1) and the set of computing devices that subsequently provide the directory service may be referred to as the second set (e.g., computing device set 124B of FIG. 1). Provisioning module 228 may identify the computing devices to include in the second set based on the first set, user input, storage object 132, environment data 232, other data, or a combination thereof. The second set may include one or more computing devices that substitute, supplement, or replace computing devices of the first set. In one example, the provisioning module 228 may select at least one computing device from a pool of available computing resources that are distinct from the first set of computing devices. After identifying the computing devices, the provisioning module 228 may analyze the configuration of the computing devices.

Provisioning module 228 may analyze and modify the configuration of one or more of the computing devices in the second set. Provisioning module 228 may determine whether a particular computing device is configured to provide a directory service by querying configuration information directly from computing device or from a separate device (e.g., provisioning manager). Provisioning module 228 may analyze and compare the configuration of the computing device to determine (e.g., check) whether the computing device includes the directory service. If the computing device does not include the directory service, provisioning module 228 may add the directory service to the particular computing device. Adding a directory service to the computing device and may include one or more operations that activate, configure, install, repair, remove, reinstall, or update, the directory service and/or underlying dependencies of the directory service. In one example, provisioning module 228 may install (e.g., re-install) directory services on a particular computing device and designate the particular computing device to function as a domain controller.

Restoration orchestration module 229 may access the computing devices configured by provisioning module 228 and perform a restoration process to update the computing devices to restore the directory service to the computing environment. Restoration orchestration module 229 may be executed by the same computing device that managed the backup of the directory service or by a different computing device. The restoration process may be initiated in view of a request (e.g., restore request). In one example, the request may be generated or transmitted in response to user input and the user input may indicate one or more storage objects 132, computing devices (e.g., 120X-Z of FIG. 1), other data, or a combination thereof. In another example, the restore request may be generated and transmitted automatically (e.g., without user input) in response to detecting an occurrence of an adverse event. Computing device 120 or any other device in the computing environment may detect the adverse event by analyzing incoming or outgoing communications (e.g., missing heart beat or keep alive messages), analyzing log entries (e.g., searching for particular error messages), other technique, or a combination thereof.

Restoration orchestration module 229 may perform the restoration process by identifying a set of tasks and coordinating execution of the tasks to update the second set of computing devices. As discussed above, the directory service may be distributed across multiple computing devices that work together as a group to provide the directory service to client devices of the computing environment. The portion of the directory service executing on each computing device may be tightly integrated with the underlying operating system of the computing device and may include synchronization features. The synchronization features may enable the group of computing devices to synchronize modifications of the directory service between the different computing devices. The synchronization features and tight integration may create dependencies between computing device and between portions of the directory service. Restoration orchestration module 229 may detect, analyze, and account for the dependencies when generating the set of tasks to perform the restoration.

The set of tasks may be performed to update the set of computing devices and restore the particular state of the directory service that existed when the backup occurred. The set of tasks may be executed sequentially or in parallel on one or more of the computing devices in the second set. The set of tasks may indicate which computing devices should be modified and the order in which they should be executed. The set of tasks may be separated into one or more task sequences and one or more of the task sequences may be specific to a particular computing device or group of computing devices. In one example, one of the computing devices in the second set may be selected to host the root domain of the domain hierarchy and may be initiated or finish before, during, or after one or more of the other computing devices.

The computing devices in the second set may have been previously configured to include the executable programs that provide the directory services but may not include the appropriate state data (e.g., current AD database). In one example, the computing devices in the second set may be absent state data for the directory services. In another example, the computing devices in the second set may include state data for the directory services but the state data may correspond to a default or initial state. In either example, the set of tasks may be executed to update the second set of computing devices to include the state from one or more of the storage objects 132. The updating may involve one or more operations to replace, add, delete, move, or change the first state (e.g., default state) to the second state (e.g., backed up state) on one or more of the computing devices of the second set.

The restoration process can be performed with or without the existence of a domain name system (DNS) service. The DNS service is often integrated with the directory service and may be affected also be affected by the adverse event. The technology disclosed herein may enable the domain system to be restored in the absence of running DNS. This may be accomplished because the one or more storage objects 132 may include network mapping data that may be used to resolve host names to IP addresses and displace the reliance on the DNS service. As a result, some or all of the computing devices in the second set may be updated even though the DNS service is not functioning.

In one example, the set of tasks may also include operations to disable or enable synchronization features (e.g., replication) of the directory service on the computing device that is being updated. The operations may execute before, during, or after updating the computing device. For example, the operation may disable synchronization before updating the computing device and enable (e.g., re-enable) it after the directory service has been restored to some or all of the computing devices. The synchronization features of the directory service may include a mechanism for tracking the changes of different directory service instances and for sharing the tracked changes with other computing devices (e.g., other domain controllers). As discussed above, the directory service may be provided by one or more computing devices that are located across one or more geographic locations. The one or more computing devices may store one or more instances (e.g., copies, versions) of the domain data store. In one example, each computing device associated with a domain may store an instance of the domain data store. In another example, an instance of the directory service may be shared or provided by a combination of computing devices. In other examples, one geographic site may include an instance of the domain data store on a single computing device and another geographic site may include an instance of the domain data store that is shared across multiple computing devices. This may be done to handle different quantities of users, devices, activity, other factors, or a combination thereof.

The synchronization features may support bidirectional synchronization, unidirectional synchronization, or a combination thereof and each may be handled differently when restoring the directory service. The bidirectional or unidirectional synchronization may correspond to a portion of a directory service or the entire directory service and involve replicating, duplicating, copying, moving, migrating, other action, or a combination thereof. Bidirectional synchronization may involve a computing device transmitting changes that affected a local instance of a directory service and receiving changes from other devices that affected one or more remote instance of the directory service. Unidirectional synchronization may receive changes from other computing devices that affected remote instances without transmitting changes affecting a local instance. This may occur when there are no changes originating at the receiving computing device. This may be the result of the local instance of the directory service functions as a backup, recovery, failover, load balancing, other purpose, or a combination thereof. The restoration process discussed above may include or avoid restoring computing devices performing these functions. The synchronization features may include a programming interface to access a set of synchronization operations that are native to the directory server (e.g., native to Active Directory service). The programming interface may be accessible locally or remotely (e.g., over a network) using an application programming interface (API). One or more of the set of tasks may use the API to disable or enable the synchronization features on one or more of the computing devices before, during, or after the restoration process has begun or ended.

Figure 3:
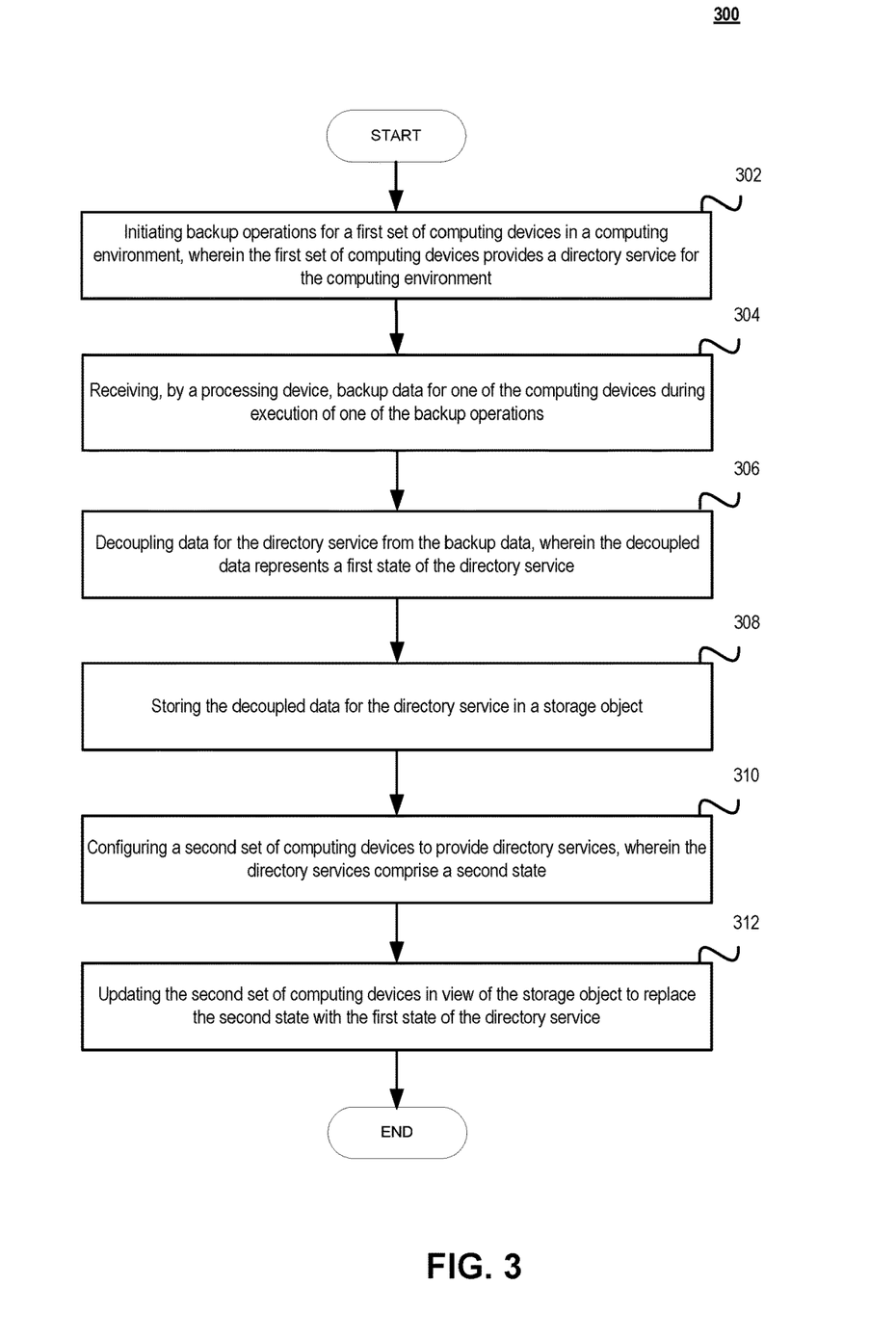
FIG. 3 is a flow diagram illustrating an exemplary process for backing up and restoring a directory service to a distributed set of computing devices, according to some implementations.

FIG. 3 depicts a flow diagram of example method 300 for backing up and restoring a directory service in accordance with an aspect of the invention. Method 300 may be performed by processing devices that may comprise hardware (e.g., circuitry, dedicated logic), software (such as is run on a general purpose computer system or a dedicated machine), or a combination of both. Method 300 and each of its individual functions, routines, subroutines, or operations may be performed by one or more processors of the computer device executing the method. In certain implementations, method 300 may each be performed by a single processing device. Alternatively, method 300 may be performed by two or more processing devices, each processing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by computing device 120 of FIGS. 1 and 2.

Method 300 may be performed by processing devices of a backup management device, one or more domain controllers, or a combination thereof and may begin at block 302. At block 302, a processing device may initiate one or more backup operations (e.g., Operating System (OS) level backup) for a first set of computing devices in a computing environment. The first set of computing devices may provide one or more directory services for the computing environment. The directory service may comply, support, or implement a Lightweight Directory Access Protocol (LDAP), other directory protocol, or a combination thereof. The directory service may include a hierarchy of domains and in one example, the hierarchy of domains may be the same or similar to an Active Directory domain forest. In one example, the processing device may analyze the computing environment to identify the directory service for the computing environment. The processing device may determine a domain controller in the computing environment for each domain of the hierarchy of domains and update the first set of computing devices to include the domain controller for each domain.

At block 304, the processing device may receive backup data for one of the computing devices before, during, or after execution of one of the backup operations. The backup operation may have initiated a system level back up (e.g., Operating System backup) on a computing device in the first set and the computing device may provide (e.g., transmit, store, or otherwise make available) the backup data to the processing device.

At block 306, the processing device may decouple data for the directory service from the backup data. The backup data may include executable data and wherein decoupling the data for the directory service from the backup data causes the decoupled data to be absent the executable data. The resulting decoupled data may represent a first state of the directory service and contain data to restore the first state to one or more computing devices.

At block 308, the processing device may store the decoupled data for the directory service in a storage object. The storage object may include the decoupled data and may or may not be enriched with additional data. The additional data may include environment data from other devices in computing environment (e.g., alternate data sources). In one example, the storage object may include domain topology data for the directory service and network mapping data for the computing environment. The processing device or any other device can use the storage object to update a second set of computing devices. The update may occur in response to receiving a request to restore the directory service. The request may be initiated via user input or in the absence of user input and may occur before, during, or after an adverse event affects the directory service.

At block 310, the processing device may configure the second set of computing devices to provide directory services. The one or more directory services of the second set of computing devices may be in a second state that is different from the first state discussed above. In one example, the first state may be the state of the directory service at a time when the backup operations are initiated and the second state may be an initial state (e.g., default state) of the directory services when the directory services are added (e.g., installed, activated, or configured) to the one or more of the second set of computing devices. The computing devices in the second set may be the same or similar to the computing devices in the first set. In one example, the first and second sets of computing devices may include the same set of computing devices. In another example, either the first or second set may include a computing device that is absent from the other set. In either example, the first set of computing devices and the second set of computing devices may be in a single data center or within multiple data centers.

When the second set includes one or more computing devices that are absent from the first set, the processing device may configure the second set by provisioning the one or more computing devices to substitute, supplement, or replace the computing devices of the first set. The provisioning may involve selecting at least one computing device from a plurality of computing devices that are separate from the first set of computing devices. The configuration may involve installing (e.g., re-installing) directory services on the selected computing devices and designating the at least one computing device of the second set of computing devices to function as a domain controller. In one example, the first set of computing devices comprise physical machines functioning as domain controllers and the second set of computing devices comprise virtual machines that will function as domain controllers and replace the physical machines.

At block 312, the processing device may update the second set of computing devices in view of the storage object to replace the second state with the first state of the directory service. Replacing the second state with the first state may be the same or similar to restoring the first state of the directory service to one or more of the computing devises of the second set. In one example, the processing device may determine the directory service comprises a hierarchy of domains before, during, or after initiating the restore and select a first computing device from the second set to host a root domain of the hierarchy of domains. Each of the computing devices of the second set may be configured and updated to function as a domain controller for one or more of the domains in the hierarchy of domains. The configuring and updating may involve disabling replication of the directory service on at least one computing device of the second set. In one example, the processing device may perform the configuring or updating using the network mapping data to enable the processing device to restore the directory service in the absence of a functioning name resolution service (e.g., domain name system (DNS) service). Responsive to completing the operations described herein above with references to block 312, method 300 may terminate.

Figure 4:
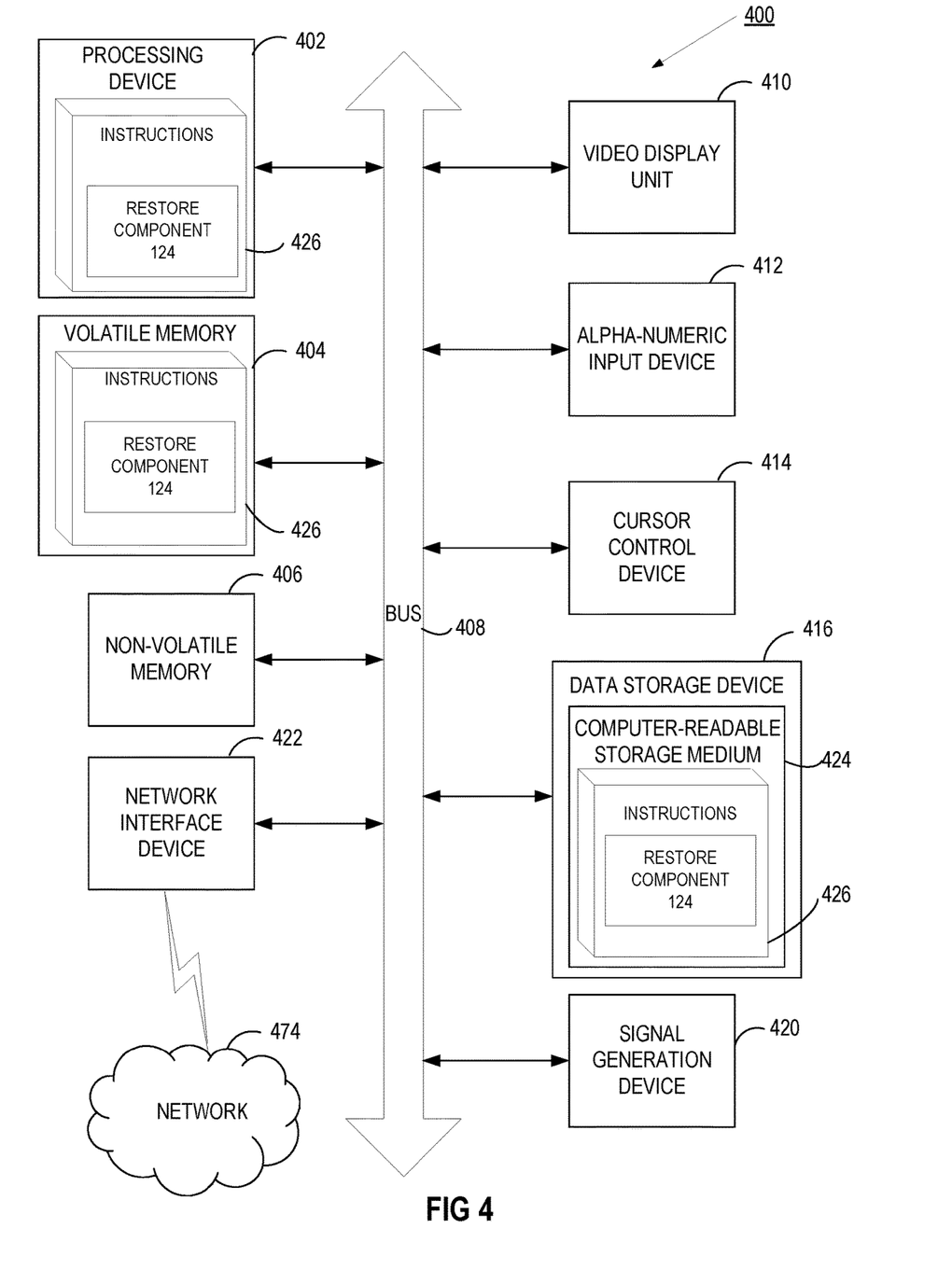
FIG. 4 is a diagrammatic representation of a machine in the exemplary form of a computer system configured to perform one or more of the operations described herein.

FIG. 4 depicts a block diagram of a computer system operating in accordance with one or more aspects of the present disclosure. In various illustrative examples, computer system 400 may correspond to computing devices 120A-Z of FIGS. 1 and 120 of FIG. 2.

The computer system may be included within a data center or external to a data center. In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alphanumeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions for implementing method 300 and for encoding the restore component of FIGS. 1 and 2.

Instructions 426 may also reside, completely or partially, within volatile memory 404 and/or within processing device 402 during execution thereof by computer system 400, hence, volatile memory 404, and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs, or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "receiving," "decoupling," "storing," "configuring, " "updating," "transmitting," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In addition, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    initiating backup operations for a first set of computing devices in a computing environment, wherein the first set of computing devices provides a directory service for the computing environment;
    receiving, by a processing device, backup data for one of the computing devices during execution of one of the backup operations;
    decoupling data for the directory service from the backup data, wherein the decoupled data represents a first state of the directory service;
    storing the decoupled data for the directory service in a storage object;
    configuring a second set of computing devices to provide directory services, wherein the directory services comprise a second state; and
    updating the second set of computing devices in view of the storage object to replace the second state with the first state of the directory service.

2. The method of claim 1, wherein the directory service complies with a Lightweight Directory Access Protocol (LDAP) and comprises a hierarchy of domains, wherein the hierarchy of domains comprises a domain forest.

3. The method of claim 1, wherein the backup data comprises executable data and wherein decoupling the data for the directory service from the backup data causes the decoupled data to be absent the executable data.

4. The method of claim 1, wherein the first state comprises a state of the directory service at a time when the backup operations are initiated and wherein the second state comprises a default state of the directory services when the directory services are installed on the second set of computing devices.

5. The method of claim 1, further comprising:
identifying, by the processing device, the directory service for the computing environment, wherein the directory service comprises a hierarchy of domains;
determining a domain controller in the computing environment for each domain of the hierarchy of domains; and
updating the first set of computing devices to include the domain controller for each domain.

6. The method of claim 1, wherein the storage object comprises domain topology data for the directory service and network mapping data for the computing devices providing the directory service.

7. The method of claim 6, wherein updating the second set of computing devices comprises using the network mapping data to restore the first state of the directory service to the second set of computing devices in the absence of domain name system (DNS) services.

8. The method of claim 1, further comprising:
receiving a request to restore the directory service after an adverse event affects the directory service;
determining in view of the storage object that the directory service comprises a hierarchy of domains;
selecting a first computing device from the second set to host a root domain of the hierarchy of domains; and
restoring the first state of the directory service to the second set of computing devise, wherein each computing device of the second set functions as a domain controller for a domain in the hierarchy of domains.

9. The method of claim 1, wherein configuring the second set of computing devices comprises disabling synchronization of the directory service on at least one of the second set of computing devices.

10. The method of claim 1, wherein configuring the second set of computing devices comprises:
selecting at least one computing device of the second set of computing devices from a plurality of computing devices that are separate from the first set of computing devices; and
installing directory services on the at least one computing device; and
designating the at least one computing device of the second set of computing devices to function as a domain controller.

11. The method of claim 1, wherein the first set of computing devices and the second set of computing devices comprise the same set of computing devices.

12. The method of claim 1, wherein the first set of computing devices and the second set of computing devices comprise a different set of computing devices.

13. A system comprising:
a memory; and
a processing device communicatively coupled to said memory, said processing device configured to:
initiate backup operations for a first set of computing devices in a computing environment, wherein the first set of computing devices provides a directory service for the computing environment;
receive backup data for one of the computing devices during execution of one of the backup operations;
decouple data for the directory service from the backup data, wherein the decoupled data represents a first state of the directory service;
store the decoupled data for the directory service in a storage object;
configure a second set of computing devices to provide directory services, wherein the directory services comprise a second state; and
update the second set of computing devices in view of the storage object to replace the second state with the first state of the directory service.

14. The system of claim 13, wherein the directory service complies with a Lightweight Directory Access Protocol (LDAP) and comprises a hierarchy of domains, wherein the hierarchy of domains comprises a domain forest.

15. The system of claim 13, wherein the backup data comprises executable data and wherein to decouple the data for the directory service from the backup data causes the decoupled data to be absent the executable data.

16. The system of claim 13, wherein the first state comprises a state of the directory service at a time when the backup operations are initiated and wherein the second state comprises a default state of the directory services when the directory services are installed on the second set of computing devices.

17. A non-transitory computer readable storage medium comprising instructions to cause a processor to:
initiate backup operations for a first set of computing devices in a computing environment, wherein the first set of computing devices provides a directory service for the computing environment;
receive backup data for one of the computing devices during execution of one of the backup operations;
decouple data for the directory service from the backup data, wherein the decoupled data represents a first state of the directory service;
store the decoupled data for the directory service in a storage object;
configure a second set of computing devices to provide directory services, wherein the directory services comprise a second state; and
update the second set of computing devices in view of the storage object to replace the second state with the first state of the directory service.

18. The non-transitory computer readable storage medium of claim 17, wherein the directory service complies with a Lightweight Directory Access Protocol (LDAP) and comprises a hierarchy of domains, wherein the hierarchy of domains comprises a domain forest.

19. The non-transitory computer readable storage medium of claim 17, wherein the backup data comprises executable data and wherein decoupling the data for the directory service from the backup data causes the decoupled data to be absent the executable data.

20. The non-transitory computer readable storage medium of claim 17, wherein the first state comprises a state of the directory service at a time when the backup operations are initiated and wherein the second state comprises a default state of the directory services when the directory services are installed on the second set of computing devices.

\* \* \* \* \*